United States Patent
Ai et al.

(10) Patent No.: US 9,969,147 B2
(45) Date of Patent: May 15, 2018

(54) PANEL AND METHOD FOR MANUFACTURING THE SAME

(71) Applicant: AU Optronics Corporation, Hsin-Chu (TW)

(72) Inventors: Chia-Hua Ai, Hsin-Chu (TW); Tseng Yu, Hsin-Chu (TW)

(73) Assignee: AU OPTRONICS CORPORATION, Hsin-Chu (TW)

(*) Notice: Subject to any disclaimer, the term of this patent is extended or adjusted under 35 U.S.C. 154(b) by 0 days. days.

(21) Appl. No.: 15/392,409

(22) Filed: Dec. 28, 2016

(65) Prior Publication Data
US 2017/0368794 A1 Dec. 28, 2017

(30) Foreign Application Priority Data
Jun. 23, 2016 (TW) .............................. 105119756 A

(51) Int. Cl.
| B32B 3/02 | (2006.01) |
| B32B 7/14 | (2006.01) |
| G02F 1/1341 | (2006.01) |
| G02F 1/1335 | (2006.01) |

(52) U.S. Cl.
CPC ............ *B32B 7/14* (2013.01); *B32B 2250/02* (2013.01); *B32B 2255/26* (2013.01); *B32B 2307/42* (2013.01); *B32B 2457/202* (2013.01); *G02F 1/1341* (2013.01); *G02F 1/133512* (2013.01); *G02F 1/133514* (2013.01)

(58) Field of Classification Search
CPC .... G02F 1/1341; B32B 7/14; B32B 2457/202
See application file for complete search history.

(56) References Cited

U.S. PATENT DOCUMENTS

| 2007/0196949 | A1 | 8/2007 | Lee |
| 2008/0286943 | A1* | 11/2008 | Nishio .................. C03B 33/023 438/460 |
| 2010/0173555 | A1 | 7/2010 | Nishi et al. |
| 2011/0122633 | A1 | 5/2011 | Han et al. |
| 2016/0306221 | A1* | 10/2016 | Wang ................ G02F 1/133351 |

FOREIGN PATENT DOCUMENTS

| CN | 103819082 A | 5/2014 |
| CN | 104439720 A | 3/2015 |

OTHER PUBLICATIONS

Taiwan Intellectual Property Office, "Office Action", dated Feb. 24, 2017.

* cited by examiner

*Primary Examiner* — Elizabeth E Mulvaney
(74) *Attorney, Agent, or Firm* — WPAT, PC

(57) ABSTRACT

A method for manufacturing a panel includes at least one step as below. A pre-treatment is performed on a first bonding component between two substrates, so that a part of a first bonding portion of the first bonding component becomes a first transformation portion, in which at least one characteristic of the first bonding portion is different from that of the first transformation portion.

24 Claims, 6 Drawing Sheets

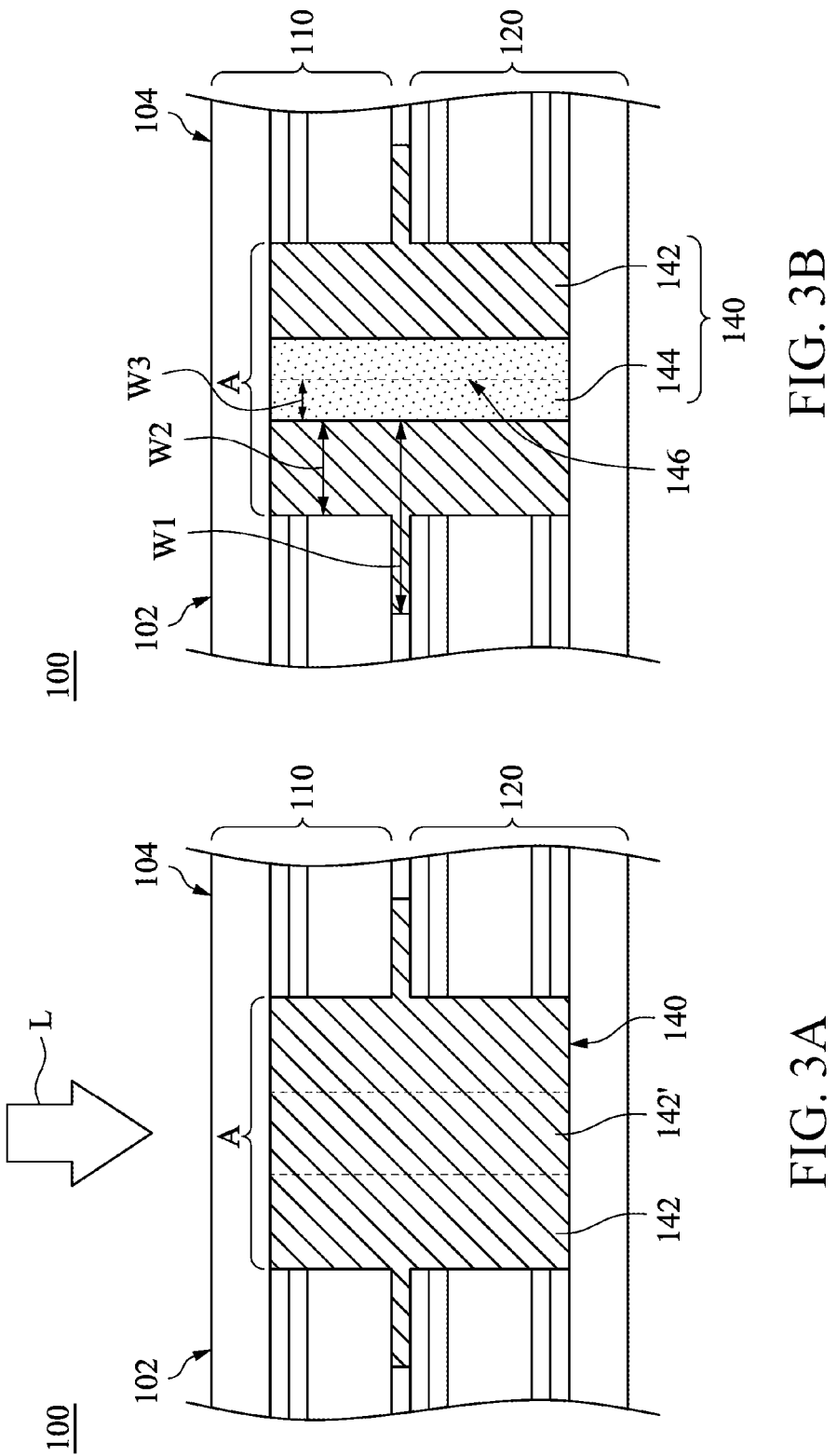

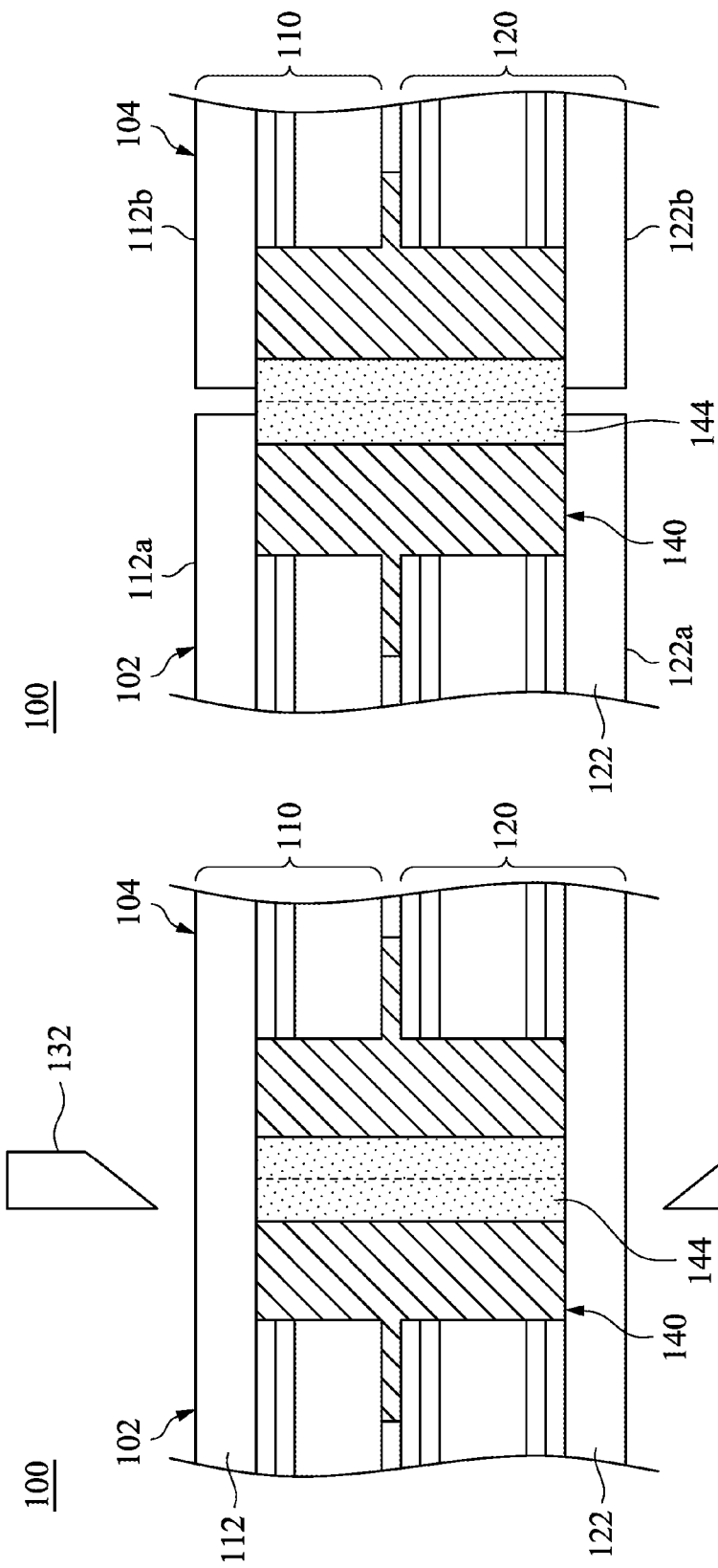

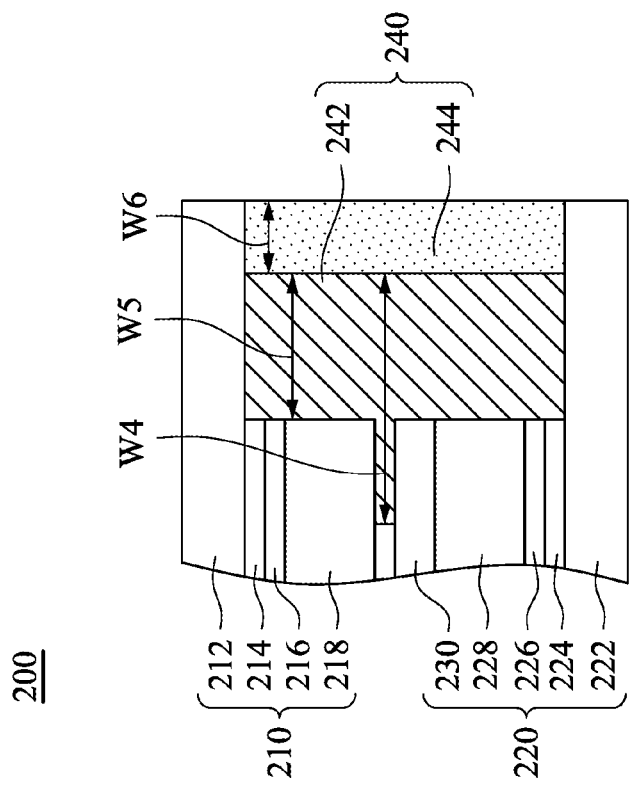
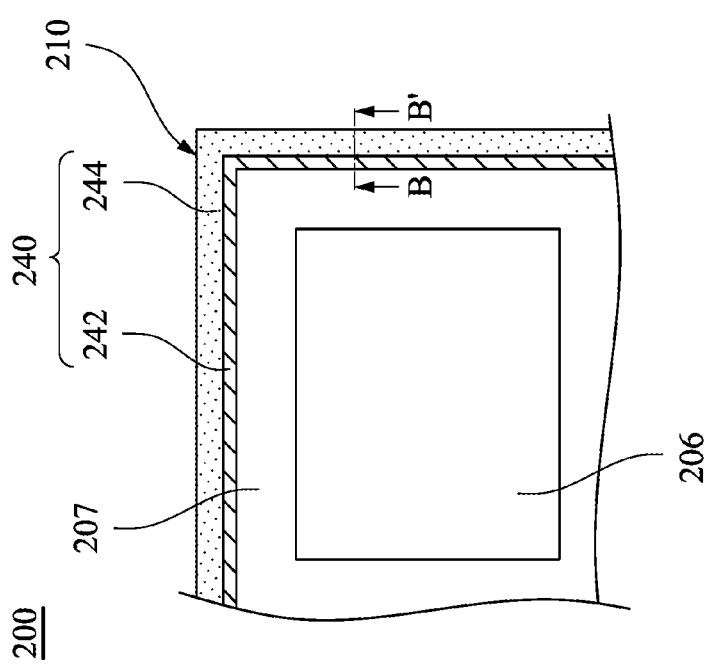
FIG. 4B
FIG. 4A

PANEL AND METHOD FOR MANUFACTURING THE SAME

BACKGROUND

Technical Field

The present invention relates to a panel and a method for manufacturing the same.

Related Art

Display panels have been widely used in home appliances and industrial instruments such as television sets, instrument panels, and dynamic signs. For this, procedures of manufacturing display panels are already introduced in mass production, thereby reducing manufacturing cost. For example, in a procedure of manufacturing a display panel, a plurality of semi-finished panels may be formed within a motherboard, and next, segment the motherboard to form the plurality of panels separated from each other.

However, when the plurality of panel is being separated from each other, a performed process may cause damage to a panel, and reduce a manufacturing yield and result in a cost burden. For this, how to improve a mass production process of display panels becomes one of the most important development topics in the related art, and also becomes an aspect in which improvements are urgently needed at present.

SUMMARY

At least one embodiment of the present invention provides a method for manufacturing a panel. In the method, a pre-treatment may be performed on a first bonding component inside a motherboard, so that a part of a first bonding portion of the first bonding component becomes a first transformation portion, in which cracking (e.g., thermal cracking) or charring occurs in the first transformation portion, so that the first transformation can be easily fractured or is directly fractured. Therefore, when a segment procedure is being performed on the motherboard, a possibility of structural peeling may be reduced.

At least one embodiment of the present invention provides a method for manufacturing a panel, including: performing a pre-treatment on a first bonding component between two substrates, so that a part of a first bonding portion of the first bonding component becomes a first transformation portion, in which at least one characteristic of the first bonding portion is different from that of the first transformation portion.

In at least one embodiment, a motherboard includes the two substrates, and after the step of performing a pre-treatment, the method further includes: performing a segment procedure on the motherboard, to form a plurality of panels, each of the panels including a first sub-substrate, a second sub-substrate, and a second bonding component, where the second bonding component is located between the first sub-substrate and the second sub-substrate, and the second bonding component includes a second bonding portion and a second transformation portion.

In at least one embodiment, the step of performing a segment procedure includes damaging the first transformation portion of the first bonding component.

In at least one embodiment, a property of the second bonding portion of the second bonding component is substantially the same as a property of the first bonding portion of the first bonding component, and a property of the second transformation portion of the second bonding component is substantially the same as a property of the first transformation portion of the first bonding component.

In at least one embodiment, the characteristic is an optical density value, an optical density value of the second bonding portion of the second bonding component is 0.65 to 0.75, and an optical density value of the second transformation portion of the second bonding component is 0.75 to 1.5.

In at least one embodiment, the second transformation portion of the second bonding component has a composition, and the second bonding portion of the second bonding component does not have the composition, where the composition comprises an acrylic acid derivative, an epoxy resin derivative or a combination thereof.

In at least one embodiment, the first transformation portion of the first bonding component includes at least one of a cracked structure and a charred structure.

In at least one embodiment, the characteristic is an optical density value, an optical density value of the first bonding portion of the first bonding component is 0.65 to 0.75. An optical density value of the first transformation portion of the first bonding component is 0.75 to 1.5.

In at least one embodiment, the pre-treatment includes a laser heating process, a high-frequency induction heating process, an infrared heating process or a combination thereof.

In at least one embodiment, the pre-treatment is a heating process, and the heating process provides a heating temperature, where the heating temperature is between 200° C. and 600° C.

In at least one embodiment, before the step of performing the pre-treatment, the manufacturing method further includes: curing a bonding agent by using the curing temperature so that the bonding agent becomes the first bonding component, where the curing temperature is less than the heating temperature provided in the heating process.

In at least one embodiment, the first bonding component includes a thermal curing adhesive, a light curing adhesive, frit or a combination thereof.

In at least one embodiment, a ratio of the width of the first transformation portion to that of the first bonding portion of the first bonding component is 5% to 30%.

At least one embodiment of the present invention provides a panel, including a first sub-substrate, a second sub-substrate, a bonding portion, and a transformation portion. The bonding portion is located between the first sub-substrate and the second sub-substrate. The transformation portion is located between the first sub-substrate and the second sub-substrate. The transformation portion is further located at an outer side of the bonding portion, where at least one characteristic of the bonding portion is different from that of the transformation portion.

In at least one embodiment, the first sub-substrate includes a first base, a light-shielding layer, and a color filter layer. The light-shielding layer and the color filter layer are located on the first base, where the transformation portion is located outside a lateral side of the light-shielding layer and/or the color filter layer.

In at least one embodiment, the transformation portion is not located between the light-shielding layer and the second sub-substrate.

In at least one embodiment, the transformation portion is not located between the color filter layer and the second sub-substrate.

In at least one embodiment, the transformation portion comprises a composition, and the bonding portion does not have the composition, where the composition comprises an acrylic acid derivative, an epoxy resin derivative or a combination thereof.

In at least one embodiment, the characteristic is an optical density value, an optical density value of the bonding portion is 0.65 to 0.75, and an optical density value of the transformation portion is 0.75 to 1.5.

In at least one embodiment, a ratio of the width of the transformation portion to that of the bonding portion is 5% to 30%.

In at least one embodiment, the transformation portion includes at least one of a cracked structure and a charred structure.

BRIEF DESCRIPTION OF THE DRAWINGS

FIG. 3A is a schematic sectional view of a first bonding component on which a pre-treatment is performed a step of a method for manufacturing a panel according to one embodiment of the present invention, where a sectional position in FIG. 3A is the same as that in FIG. 2B;

FIG. 3B is a schematic sectional view of a first bonding component after the pre-treatment has been performed on the first bonding component in a step of the method for manufacturing a panel according to one embodiment of the present invention, where a sectional position in FIG. 3B is the same as that in FIG. 2B;

FIG. 3C is a schematic sectional view of a motherboard on which a segment procedure is performed in a step of the method for manufacturing a panel according to one embodiment of the present invention, where a sectional position in FIG. 3C is the same as that in FIG. 2B;

FIG. 3D is a schematic sectional view of the motherboard after the segment procedure has been performed in a step of the method for manufacturing a panel according to one embodiment of the present invention, where a sectional position in FIG. 3D is the same as that in FIG. 2B;

FIG. 4A is a schematic top view of a panel formed by using a method for manufacturing a panel according to one embodiment of the present invention; and FIG. 4B is a schematic sectional view along line BB' in FIG. 4A.

DETAILED DESCRIPTION

A plurality of embodiments of the present invention are disclosed below with reference to the accompanying drawings. For clear description, many details in practice will be described together in the following description. However, it should be understood that these details in practice should not be used to limit the present invention. That is, in some implementation manners of the present invention, these details in practice are not essential. In addition, to simplify the accompanying drawings, some conventional structures and elements are shown in a simple schematic manner in the accompanying drawings.

In view of that when a motherboard is being segmented to form a plurality of panels, a performed cutting process may cause damage to a panel, which further reduces a manufacturing yield and results in a cost burden, an embodiment of the present invention provides a method for manufacturing a panel. In the method, a pre-treatment may be performed on a first bonding component inside the motherboard, so that a part of a first bonding portion of the first bonding component becomes a first transformation portion, where cracking (e.g., thermal cracking) or charring occurs in the first transformation portion, so that the first transformation can be easily fractured or is directly fractured. Therefore, when a segment procedure is performed on the motherboard, a possibility of structural peeling may be reduced. Manufacturing procedures of the method for manufacturing a panel according to at least one embodiment of the present invention are described below with reference to the accompanying drawings.

Figure 1:
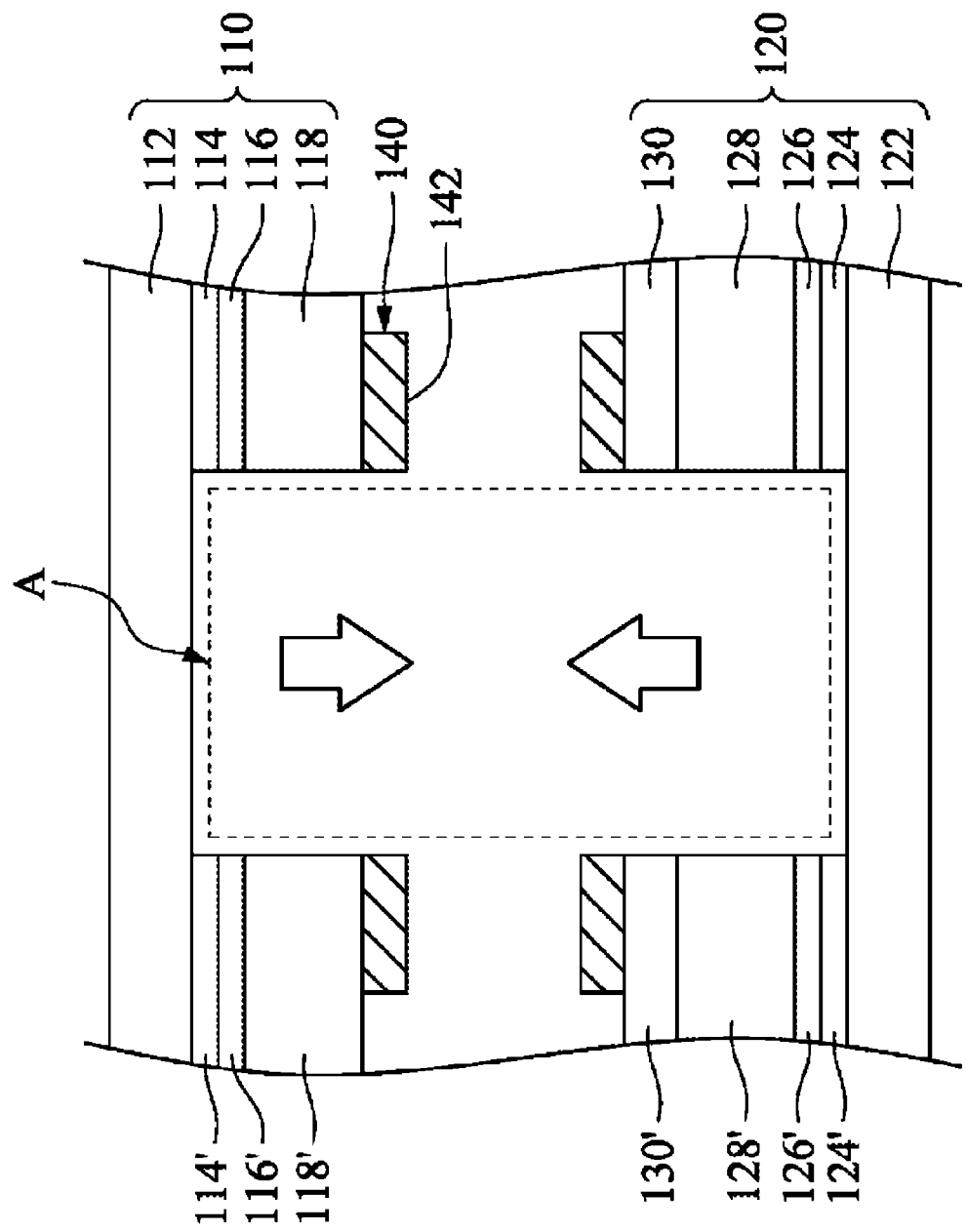
FIG. 1 is a schematic side view of a motherboard comprising two substrates in a step of a method for manufacturing a panel according to one embodiment of the present invention.

Referring to FIG. 1, FIG. 1 is a schematic side view of a motherboard comprising two substrates in a step of a method for manufacturing a panel according to one embodiment of the present invention. In this step, the two substrates may be assembled into one motherboard by using a first bonding component 140 (FIG. 2B), where one of the two substrates may be an upper substrate 110 shown in FIG. 1, and the other of the two substrates may be a lower substrate 120 shown in FIG. 1.

The upper substrate 110 includes a first base 112, a light-shielding layer 114, a color filter layer 116, and a gap structure 118, where the light-shielding layer 114, the color filter layer 116, and the gap structure 118 are located on the first base 112. The light-shielding layer 114 may be disposed on the first base 112, the color filter layer 116 is disposed on the light-shielding layer 114, and the gap structure 118 is disposed on the color filter layer 116. The lower substrate 120 includes a second base 122, a first passivation layer 124, a second passivation layer 126, a third passivation layer 128, a fourth passivation layer 130, where the first passivation layer 124 is disposed on the second base 122, the second passivation layer 126 is disposed on the first passivation layer 124, the third passivation layer 128 is disposed on the second passivation layer 126, and the fourth passivation layer 130 is disposed on the third passivation layer 128.

The structures of the layers of the upper substrate 110 and the lower substrate 120 shown in FIG. 1 are only an example, and a person of ordinary skill in the art may flexibly adjust or dispose the structures of the layers. In addition, after the upper substrate 110 and the lower substrate 120 are assembled into the motherboard, the motherboard may be further segmented into a plurality of panels. Therefore, the arrangement of the structures of the layers of the upper substrate 110 and the lower substrate 120 may correspond to different panels. For example, the positions where the first base 112, the light-shielding layer 114, the color filter layer 116, and the gap structure 118 of the upper substrate 110 and the second base 122, the first passivation layer 124, the second passivation layer 126, the third passivation layer 128, and the fourth passivation layer 130 of the lower substrate 120 are disposed correspond to one panel, whereas the positions where the first base 112, a light-shielding layer 114', a color filter layer 116', and the gap structure 118' of the upper substrate 110 and the second base 122, a first passivation layer 124', a second passivation layer 126', a third passivation layer 128', and a fourth passivation layer 130' of the lower substrate 120 are disposed correspond to the other panel, where a space between the two panels may be used as a cutting area for a segment procedure performed subsequent, and is represented by a cutting area A.

The first bonding component 140 is disposed between the upper substrate 110 and the lower substrate 120. For example, a plurality of first bonding components 140 may be disposed between the upper substrate 110 and the lower substrate 120. The plurality of first bonding components 140 is disposed respectively on the gap structures 118 and 118' of the upper substrate 110 and/or on the fourth passivation layers 130 and 130' of the lower substrate 120. The first bonding component 140 includes a first bonding portion 142, where the first bonding portion 142 may have adhesion, so that the first bonding component 140 may enable the upper substrate 110 and the lower substrate 120 to be bonded or adhered by using the first bonding portion 142.

Before the step of bonding the upper substrate 110 and the lower substrate 120 by using the first bonding component 140, an alignment process may be performed and a liquid crystal material is filled between the upper substrate 110 and the lower substrate 120. In the step of bonding the upper substrate 110 and the lower substrate 120 by using the first bonding component 140, the upper substrate 110 and the lower substrate 120 may respectively approach each other in directions of arrows, and the first bonding component 140 comes into contact with the upper substrate 110 and the lower substrate 120, so that the upper substrate 110 and the lower substrate 120 are bonded or adhered. In addition, in a process in which the upper substrate 110 and the lower substrate 120 approach each other, a part of the first bonding component 140 may be squeezed into the cutting area A between the two panels.

Figure 2A:
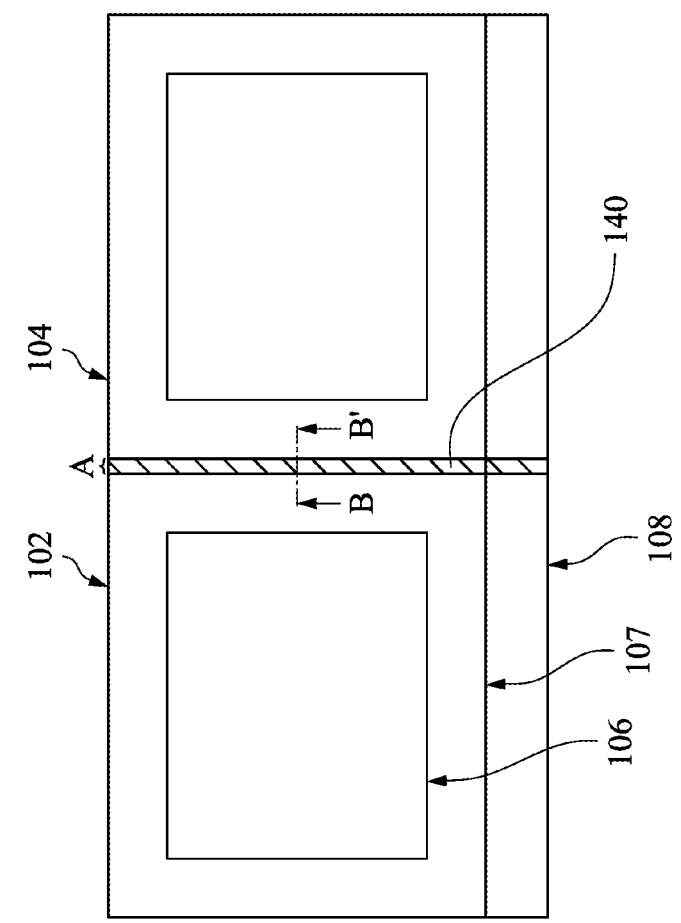
FIG. 2A is a schematic top view of the motherboard that comprises an upper substrate and a lower substrate in FIG. 1.
Figure 2B:
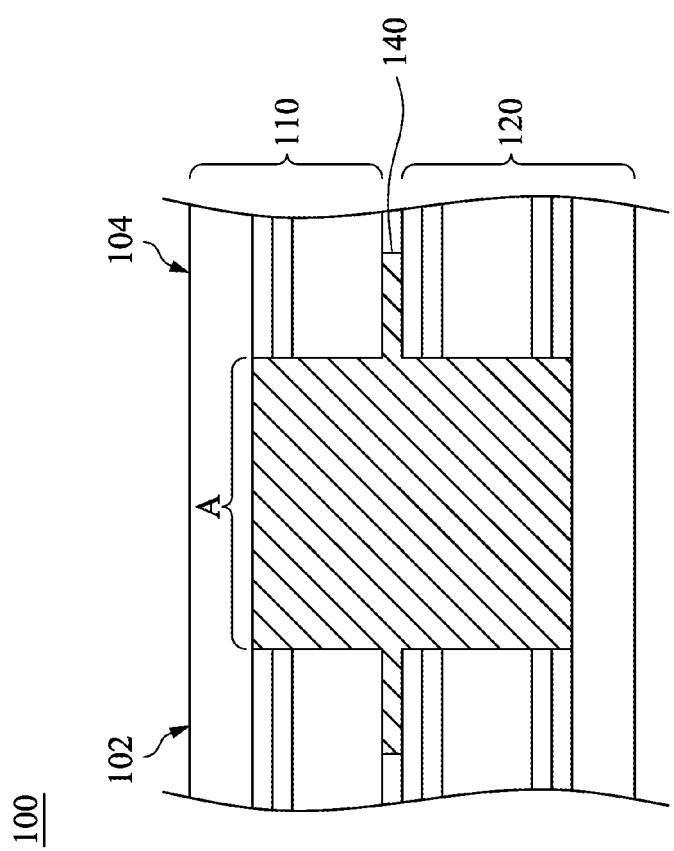
FIG. 2B is a schematic sectional view along line BB' in FIG. 2A.

After the upper substrate 110 and the lower substrate 120 are bonded or adhered to each other, the motherboard may be formed. For example, referring to FIG. 2A and FIG. 2B, FIG. 2A is a schematic top view of a motherboard 100 that is formed of the upper substrate 110 and the lower substrate 120 in FIG. 1, and FIG. 2B is a schematic sectional view along line BB' in FIG. 2A. Although in the motherboard 100 in FIG. 2A and FIG. 2B, only two panel areas 102 and 104 are shown, the present embodiment is not limited thereto, and a person of ordinary skill in the art may flexibly adjust a quantity of the panel areas 102 and 104 that are provided on the motherboard 100. In addition, to keep the accompanying drawings from becoming too complex, a range of the cutting area A in FIG. 2A and FIG. 2B is represented in a form of "{".

In the formed motherboard 100, the motherboard 100 has the panel areas 102 and 104, where the panel areas 102 and 104 may respectively correspond to two independent panels in the subsequent segment procedure, and the formed panel may be a narrow bezel panel. Each panel area 102 or 104 may have a display area 106, a peripheral area 107, and a wiring area 108. Same as the above, a space between the two panels may be used as the cutting area A, and the first bonding component 140 between the upper substrate 110 and the lower substrate 120 may be squeezed into the cutting area A. Therefore, the cutting area A exists between the panel areas 102 and 104, and a part of the first bonding component 140 is filled in the cutting area A.

After the motherboard 100 is formed, a pre-treatment may be performed on the first bonding component 140 between the upper substrate 110 and the lower substrate 120. For example, referring to FIG. 3A and FIG. 3B, FIG. 3A is a schematic sectional view of a first bonding component 140 on which a pre-treatment is performed a step of a method for manufacturing a panel according to one embodiment of the present invention, where a sectional position in FIG. 3A is the same as that in FIG. 2B, and FIG. 3B is a schematic sectional view of a first bonding component 140 after the pre-treatment has been performed on the first bonding component 140 in the a step of the method for manufacturing a panel according to one embodiment of the present invention, where a sectional position in FIG. 3B is the same as that in FIG. 2B. In addition, similar to FIG. 2A and FIG. 2B, to avoid the accompanying drawings from becoming too complex, a range of the cutting area A in FIG. 3A and FIG. 3B is represented in a form of "{".

In FIG. 3A, the pre-treatment is performed on the first bonding component 140 between the upper substrate 110 and the lower substrate 120, so that a part 142' of the first bonding portion 142 of the first bonding component 140 becomes a first transformation portion 144 (FIG. 3B), where the part of the first bonding portion 142 is represented by a first bonding portion 142', as shown in FIG. 3A. In this step, the pre-treatment may include a laser heating process, a radio wave heating process, an infrared heating process or a combination thereof. For example, in FIG. 3A, the pre-treatment may heat the first bonding component 140 by providing a laser L to the first bonding component 140. In other words, the pre-treatment performed on the first bonding component 140 may be a heating process, where the heating process may provide a heating temperature to the first bonding component 140. In some implementation manners, the heating temperature may be between 200° C. and 600° C. Alternatively, in another implementation manner, the heating temperature may be between 200° C. and 400° C.

By the pre-treatment, the first bonding portion 142' may gradually become the first transformation portion 144. In a process in which the first bonding portion 142' gradually becomes the first transformation portion 144, cracking (e.g., thermal cracking) or charring occurs in the formed first transformation portion 144, and a crack is formed accordingly. For example, the crack may be formed at a location shown by a dotted line 146 in FIG. 3B. Further, after the first bonding portion 142' becomes the first transformation portion 144, the remaining first bonding portion 142 is located on two opposite sides of the first transformation portion 144. After the crack is formed in the first transformation portion 144, and is gradually fractured as the crack grows, the first transformation portion 144 is easily destroyed. Alternatively, according to a time at which the pre-treatment is performed, the crack that is formed in the first transformation portion 144 may also directly divide the first transformation portion 144 into at least two parts, so that the at least two parts of the first bonding portion 142 are located on the two opposite sides of the first transformation portion 144 and are no longer connected by using the first transformation portion 144.

In addition, a person of ordinary skill in the art may flexibly adjust a size relationship between the first bonding portion 142 and the first transformation portion 144 according to the concept of the present invention. For example, in the cutting area A between the two panel areas 102 and 104, one of the first bonding portions 142 that are located on the two opposite sides of the first transformation portion 144 has two widths W1 and W2, where the width W1 is a large one of the two widths. The first transformation portion 144 has a width W3, where the width W3 is a distance from an edge of the first transformation portion 144 to the crack, and a ratio of the width W3 to the width W1 is 5% to 30%.

After the first bonding portion 142' of the first bonding component 140 becomes the first transformation portion 144, the first bonding component 140 includes the first bonding portion 142 and the first transformation portion 144, where at least one characteristic of the first bonding portion 142 is different from that of the first transformation portion 144. The characteristic, for example, may be an optical density value, elasticity, hardness, a contained component or a combination thereof.

In an implementation manner in which the different characteristic between the first bonding portion 142 and the first transformation portion 144 is an optical density value, an optical density value of the first bonding portion 142 of the first bonding component 140 is 0.65 to 0.75, and an optical density value of the first transformation portion 144 of the first bonding component 140 is 0.75 to 1.5.

In an implementation manner in which the different characteristic between the first bonding portion 142 and the first transformation portion 144 is hardness, the hardness of the first bonding portion 142 and the hardness of the first transformation portion 144 are, for example, not the same. For example, the hardness of the first transformation portion 144 may be less than that of the first bonding portion 142.

In an implementation manner in which the different characteristic between the first bonding portion 142 and the first transformation portion 144 is the composition that the first bonding portion 142 and the first transformation portion 144 have, the first transformation portion 144 of the first bonding component 140 includes at least one of a cracked structure and a charred structure. In addition, in another implementation manner in which the different characteristic between the first bonding portion 142 and the first transformation portion 144 is the composition that the first bonding portion 142 and the first transformation portion 144 have, the first transformation portion 144 of the first bonding component 140 has the composition, and the first bonding portion 142 of the first bonding component 140 does not have the composition, where the composition may be an acrylic acid derivative, an epoxy resin derivative or a combination thereof. In addition, in some implementation manners, both of the first bonding portion 142 and the first transformation portion 144 have a carbon element but still have another different composition.

Further, in the first bonding component 140, the first bonding portion 142 and the first transformation portion 144 have different characteristics. Therefore, the first bonding portion 142 and the first transformation portion 144 may be seen as two areas that are connected to each other but have different properties. For example, when the first transformation portion 144 includes a charred structure, the first transformation portion 144 may be seen as a charred area, and the first bonding portion 142 may be seen as a non-charred area.

In another aspect, the first bonding component 140 may be formed by curing a bonding agent (not shown). Specifically, in an implementation manner in which the first bonding component 140 is formed by curing the bonding agent, after the upper substrate 110 and the lower substrate 120 are assembled into the motherboard 100, and before the step of performing the pre-treatment, the manufacturing method may further include: at a curing temperature, curing a bonding agent by using the curing temperature, so that the bonding agent becomes the first bonding component 140, where the curing temperature is less than the heating temperature provided in the heating process. For example, if the heating process performed on the first bonding component 140 may provide a heating temperature of 350° C. to the first bonding component 140, the curing temperature provided to the bonding agent is less than 350° C. In other words, the first bonding component 140 may include a thermal curing adhesive. Alternatively, the first bonding component 140 may also be another curable bonding agent. For example, the first bonding component 140 may include, in addition to the thermal curing adhesive, a light curing adhesive, frit or a combination thereof.

After the first transformation portion 144 is formed, the segment procedure may be performed on the motherboard 100. For example, referring to FIG. 3C and FIG. 3D, FIG. 3C is a schematic sectional view of motherboard 100 on which a segment procedure is performed in the step of the method for manufacturing a panel according to one embodiment of the present invention, where a sectional position in FIG. 3C is the same as that in FIG. 2B. FIG. 3D is a schematic sectional view of the motherboard 100 after the segment procedure has been performed, where a sectional position in FIG. 3D is the same as that in FIG. 2B.

After the step of performing a pre-treatment, the manufacturing method further includes: performing the segment procedure on the motherboard 100, to form a plurality of panels. That is, the segment procedure is to segment the motherboard 100 into a plurality of panel areas, so that the plurality of panel areas becomes independent panels. For example, in FIG. 3C and FIG. 3D, the segment procedure includes segmenting the motherboard 100 into the panel areas 102 and 104, so that the panel areas 102 and 104 become two independent panels.

In the step of performing a segment procedure, cutter 132 may be first used to respectively cut the first base 112 of the upper substrate 110 and the second base 122 of the lower substrate 120, as shown in FIG. 3C. Further, the first base 112 of the upper substrate 110 and the second base 122 of the lower substrate 120 may be respectively cut by using the cutter 132. In an implementation manner in which the first base 112 and the second base 122 are cut by using the cutter 132, the first base 112 and the second base 122 may be cut at the same time by using two cutters 132, or the first base 112 and the second base 122 may be cut separately by using the cutter 132. After the first base 112 and the second base 122 have been cut by using the cutter 132, a part between the panel areas 102 and 104 of the first base 112 and the second base 122 is fractured, as shown in FIG. 3D, where the first base 112 is fractured into first sub-bases 112a and 112b, and the second base 122 is fractured into second sub-bases 122a and 122b.

Next, after the first base 112 and the second base 122 have been cut, the first transformation portion 144 of the first bonding component 140 may be further damaged, to complete the segment procedure on the motherboard 100. That is, for example, a step of damaging the first transformation portion 144 of the first bonding component 140 is performed. The first transformation portion 144 can be easily fractured. Therefore, the panel areas 102 and 104 may be separated from each other, to become two independent panels. Alternatively, if the first transformation portion 144 is fractured in the step of performing the pre-treatment, after the part between the panel areas 102 and 104, the panel areas 102 and 104 may be directly separated from each other, so as to become two independent panels.

That is, in a case in which the pre-treatment has been performed on the first bonding component 140 in the motherboard 100, the panel areas 102 and 104 may become easily separable, to reduce a possibility of peeling of a structural layer in the panel area 102 or 104. In another aspect, because the possibility of peeling of the structural layer is reduced, the formed panel may have relatively desirable reliability and stability.

The formed panel may be shown in FIG. 4A and FIG. 4B. FIG. 4A is a schematic top view of a panel 200 that is formed by using a method for manufacturing a panel according to one embodiment of the present invention, and FIG. 4B is a schematic sectional view along a line BB' in FIG. 4A. After the segment procedure on the motherboard 100 (referring to FIG. 3D) is completed, a plurality of panels may be formed, where the panel 200 shown in FIG. 4A is one of the plurality of panels. Each formed panel 200 includes a first sub-substrate 210, a second sub-substrate 220, and a second bonding component 240, where the second bonding component 240 is located between the first sub-substrate 210 and the second sub-substrate 220. In addition, each formed panel 200 at least has a display area 206, a peripheral area 207, and a wiring area (not shown), where the peripheral area 207 is located at a periphery of the display area 206 and may substantially surround the display area 206.

After the segment procedure on the motherboard 100 is completed, the upper substrate 110 and the lower substrate 120 of the motherboard 100 (referring to FIG. 3D) respectively become a plurality of first sub-substrates 210 and a plurality of second sub-substrates 220. Therefore, each first sub-substrate 210 and each second sub-substrate 220 also respectively correspondingly include the original structures of the upper substrate 110 and the lower substrate 120 of the motherboard 100 (referring to FIG. 3D). For example, in FIG. 4B, the first sub-substrate 210 includes a first sub-base 212, a light-shielding layer 214, a color filter layer 216, and a gap structure 218, where the light-shielding layer 214, the color filter layer 216, and the gap structure 218 are located on the first sub-base 212. Specifically, the light-shielding layer 214 is disposed on the first sub-base 212, the color filter layer 216 is disposed on the light-shielding layer 214, and the gap structure 218 is disposed on the color filter layer 216. The second sub-substrate 220 includes a second sub-base 222, a first passivation layer 224, a second passivation layer 226, a third passivation layer 228, and a fourth passivation layer 230, where the first passivation layer 224 is disposed on the second sub-base 222, the second passivation layer 226 is disposed on the first passivation layer 224, the third passivation layer 228 is disposed on the second passivation layer 226, and the fourth passivation layer 230 is disposed on the third passivation layer 228.

Similarly, after the segment procedure on the motherboard 100 (referring to FIG. 3D) is completed, the first bonding component 140 (referring to FIG. 3D) between the upper substrate 110 (referring to FIG. 3D) and the lower substrate 120 (referring to FIG. 3D) of the motherboard 100 (referring to FIG. 3D) becomes the second bonding component 240, where the second bonding component 240 includes a second bonding portion 242 and a second transformation portion 244. In addition, a shape of the second transformation portion 244 shown in FIG. 4B is related to the segment procedure performed in FIG. 3D, and what is shown in FIG. 4B is only exemplary.

The second bonding portion 242 and the second transformation portion 244 are located between the first sub-substrate 210 and the second sub-substrate 220, and are substantially located around the peripheral area 207, where the second transformation portion 244 may be further located on an outer side of the second bonding portion 242, and surrounds the second bonding portion 242. That is, as compared with the second bonding portion 242, the second transformation portion 244 is closer to an edge of the panel 200. Furthermore, the second transformation portion 244 is, for example, located outside a lateral side of the light-shielding layer 214 and/or the color filter layer 216. Alternatively, the second transformation portion 244 is, for example, located between the edge of the panel 200 and the light-shielding layer 214 and/or the color filter layer 216. The second transformation portion 244 is, for example, not located between the light-shielding layer 214 and the second sub-substrate 220. Alternatively, the second transformation portion 244 is, for example, not located between the color filter layer 216 and the second sub-substrate 220.

In addition, the second bonding portion 242 has at least two widths W4 and W5, where the width W4 is the width of the second bonding portion 242 that extends from one of the second bonding portion 242's edge between the gap structure 218 and the fourth passivation layer 230 to the another one of the second bonding portion 242's edge adjacent to the second transformation portion 244 along the horizontal direction, the width W5 is the width of the second bonding portion 242 located between the second transformation portion 244 and the light-shielding layer 214 (or the color filter layer 216) along the horizontal direction, and the width W4 is greater than the width W5. The second transformation portion 244 of the panel 200 has a width W6, where a ratio of the width W6 of the second transformation portion 244 to the width W4 of the second bonding portion 242 is 5% to 30%.

In addition, a property of the second bonding portion 242 of the second bonding component 240 is substantially the same as a property of the first bonding portion 142 (referring to FIG. 3B) of the first bonding component 140 (referring to FIG. 3B), and a property of the second transformation portion 244 of the second bonding component 240 is substantially the same as a property of the first transformation portion 144 (referring to FIG. 3B) of the first bonding component 140. Similar to the relationship between the first bonding portion 142 and the first transformation portion 144, at least one characteristic of the second bonding portion 242 may be different from that of the second transformation portion 244, where the characteristic, for example, may be an optical density value, elasticity, hardness, a contained composition or a combination thereof.

In an implementation manner in which the different characteristic between the second bonding portion and the second transformation portion is an optical density value, an optical density value of the second bonding portion of the second bonding component is 0.65 to 0.75, and an optical density value of the second transformation portion of the second bonding component is 0.75 to 1.5.

In an implementation manner in which the different characteristic between the second bonding portion and the second transformation portion is hardness, the hardness of the second bonding portion and the hardness of the second transformation portion are, for example, not the same. For example, the hardness of the second transformation portion is less than the hardness of the second bonding portion.

In an implementation manner in which the different characteristic between the second bonding portion and the second transformation portion is a component that the second bonding portion and the second transformation portion have, the second transformation portion of the second bonding component includes at least one of a cracked structure and a charred structure. In addition, in another implementation manner, the different characteristic between the second bonding portion and the second transformation portion is the composition. The second transformation portion of the second bonding component has a composition, and the second bonding portion of the second bonding component does not have the composition, where the component may be an acrylic acid derivative or an epoxy resin derivative.

In the method for manufacturing a panel according to at least one embodiment of the present invention, a pre-treatment may be performed on a first bonding component inside a motherboard, so that a part of a first bonding portion of the first bonding component becomes a first transformation portion, where cracking or charring occurs in the first transformation portion, so that the first transformation can be easily fractured or is directly fractured. Therefore, when the segment procedure is performed on the motherboard, a possibility of structural peeling may be reduced, so that the formed panel may have relatively desirable reliability and stability.

Although the present invention is disclosed as above by using a plurality of implementation manners, these implementation manners are not used to limit the present invention. Any person skilled in the art may make various changes and modifications without departing from the spirit and scope of the present invention, and therefore the protection scope of the present invention should be as defined by the appended claims.

What is claimed is:

1. A method for manufacturing a panel, comprising:
    performing a pre-treatment on a first bonding component between two substrates, so that a part of a first bonding portion of the first bonding component becomes a first transformation portion, in which at least one characteristic of the first bonding portion is different from that of the first transformation portion;
    wherein the first transformation portion of the first bonding component comprises at least one of a cracked structure and a charred structure.

2. The method for manufacturing a panel according to claim 1, wherein the two substrates form a motherboard, and after the step of performing the pre-treatment, the method further comprises:
    performing a segment procedure on the motherboard to form a plurality of panels, each of the panels comprising a first sub-substrate, a second sub-substrate and a second bonding component, wherein the second bonding component is located between the first sub-substrate and the second sub-substrate, and the second bonding component comprises a second bonding portion and a second transformation portion.

3. The method for manufacturing a panel according to claim 2, wherein the step of performing the segment procedure comprises damaging the first transformation portion of the first bonding component.

4. The method for manufacturing a panel according to claim 2, wherein a property of the second bonding portion of the second bonding component is substantially the same as the property of the first bonding portion of the first bonding component, and the property of the second transformation portion of the second bonding component is substantially the same as the property of the first transformation portion of the first bonding component.

5. The method for manufacturing a panel according to claim 2, wherein the optical density value of the second bonding portion of the second bonding component is 0.65 to 0.75, and the optical density value of the second transformation portion of the second bonding component is 0.75 to 1.5.

6. The method for manufacturing a panel according to claim 2, wherein the second transformation portion of the second bonding component comprises a composition, and the second bonding portion of the second bonding component does not comprise the composition.

7. The method for manufacturing a panel according to claim 6, wherein the composition comprises an acrylic acid derivative, an epoxy resin derivative or a combination thereof.

8. The method for manufacturing a panel according to claim 1, wherein the characteristic is an optical density value, the optical density value of the first bonding portion of the first bonding component is 0.65 to 0.75, and the optical density value of the first transformation portion of the first bonding component is 0.75 to 1.5.

9. The method for manufacturing a panel according to claim 1, wherein the pre-treatment comprises a laser heating process, a radio wave heating process, an infrared heating process or a combination thereof.

10. The method for manufacturing a panel according to claim 1, wherein the pre-treatment is a heating process providing a heating temperature being between 200° C. and 600° C., and wherein before the step of performing the pre-treatment, the method further comprises:
    curing a bonding agent by using a curing temperature so that the bonding agent becomes the first bonding component, wherein the curing temperature is less than the heating temperature provided in the heating process.

11. The method for manufacturing a panel according to claim 1, wherein the first bonding component comprises a thermal curing adhesive, a light curing adhesive, frit or a combination thereof.

12. The method for manufacturing a panel according to claim 1, wherein a ratio of a width of the first transformation portion to that of the first bonding portion of the first bonding component is 5% to 30%.

13. A panel, comprising:
    a first sub-substrate;
    a second sub-substrate;
    a bonding portion, located between the first sub-substrate and the second sub-substrate; and
    a transformation portion, located between the first sub-substrate and the second sub-substrate, the transformation portion being further located at an outer side of the bonding portion, wherein at least one characteristic of the bonding portion is different from that of the transformation portion;
    wherein the transformation portion comprises at least one of a cracked structure and a charred structure.

14. The panel according to claim 13, wherein the first sub-substrate comprises:
    a first sub-base; and
    a light-shielding layer and a color filter layer, located on the first sub-base, wherein the transformation portion is located outside a lateral side of the light-shielding layer and/or the color filter layer.

15. The panel according to claim 14, wherein the transformation portion is not located between the light-shielding layer and the second sub-substrate.

16. The panel according to claim 14, wherein the transformation portion is not located between the color filter layer and the second sub-substrate.

17. The panel according to claim 13, wherein the transformation portion comprises a composition, and the bonding portion does not have the composition.

18. The panel according to claim 17, wherein the composition is an acrylic acid derivative, an epoxy resin derivative or a combination thereof.

19. The panel according to claim 13, wherein the characteristic is an optical density value, the optical density value of the bonding portion is 0.65 to 0.75, and the optical density value of the transformation portion is 0.75 to 1.5.

20. The panel according to claim 13, wherein a ratio of a width of the transformation portion to that of the bonding portion is 5% to 30%.

21. A method for manufacturing a panel, comprising:
performing a pre-treatment on a first bonding component between two substrates, so that a part of a first bonding portion of the first bonding component becomes a first transformation portion, in which at least one characteristic of the first bonding portion is different from that of the first transformation portion;
wherein the characteristic is an optical density value, the optical density value of the first bonding portion of the first bonding component is 0.65 to 0.75, and the optical density value of the first transformation portion of the first bonding component is 0.75 to 1.5.

22. A method for manufacturing a panel, comprising:
performing a pre-treatment on a first bonding component between two substrates, so that a part of a first bonding portion of the first bonding component becomes a first transformation portion, in which at least one characteristic of the first bonding portion is different from that of the first transformation portion;
wherein a ratio of a width of the first transformation portion to that of the first bonding portion of the first bonding component is 5% to 30%.

23. A panel, comprising:
a first sub-substrate;
a second sub-substrate;
a bonding portion, located between the first sub-substrate and the second sub-substrate; and
a transformation portion, located between the first sub-substrate and the second sub-substrate, the transformation portion being further located at an outer side of the bonding portion, wherein at least one characteristic of the bonding portion is different from that of the transformation portion;
wherein the characteristic is an optical density value, the optical density value of the bonding portion is 0.65 to 0.75, and the optical density value of the transformation portion is 0.75 to 1.5.

24. A panel, comprising:
a first sub-substrate;
a second sub-substrate;
a bonding portion, located between the first sub-substrate and the second sub-substrate; and
a transformation portion, located between the first sub-substrate and the second sub-substrate, the transformation portion being further located at an outer side of the bonding portion, wherein at least one characteristic of the bonding portion is different from that of the transformation portion;
wherein a ratio of a width of the transformation portion to that of the bonding portion is 5% to 30%.

* * * * *